United States Patent

[11] 3,591,195

| [72] | Inventor | Bengt Erland Ilon<br>Bromma, Sweden |
|---|---|---|
| [21] | Appl. No. | 817,434 |
| [22] | Filed | Apr. 18, 1969 |
| [45] | Patented | July 6, 1971 |
| [73] | Assignee | A. Johnson & Co. H. A. B.<br>Stockholm, Sweden |
| [32] | Priority | Apr. 22, 1968 |
| [33] | | Sweden |
| [31] | | 5351/1968 |

[54] WHEEL ASSEMBLY FOR VEHICLES PARTICULARLY INTENDED FOR COMBINED ROAD AND CROSS-COUNTRY TRANSPORTS
8 Claims, 4 Drawing Figs.

[52] U.S. Cl. ............................................. 280/81 R,
280/5.28
[51] Int. Cl. ............................................. B60g 23/00
[50] Field of Search ............................................. 280/81,
104.5, 5.2, 5.28; 180/22, 9.5

[56] References Cited
UNITED STATES PATENTS

| 2,954,239 | 9/1960 | Kollander | 280/104.5 X |
|---|---|---|---|
| 3,235,278 | 2/1966 | Ilon | 280/5.28 |
| 3,473,820 | 10/1969 | Chaney | 280/104.5 |

FOREIGN PATENTS

| 96,931 | 10/1960 | Norway | 180/22 |
|---|---|---|---|
| 178,337 | 2/1962 | Sweden | 280/5.28 |

*Primary Examiner*—Benjamin Hersh
*Assistant Examiner*—Leslie J. Paperner
*Attorney*—Darby & Darby ABSTRACT: A vehicle wheel assembly for use in pairs on combined road and cross-country transport vehicles includes two links each articulated with a common frame and a balancing arm pivotally carried by each of the links. The balancing arms are hingedly connected with one another and support three wheels having mutually parallel axles, the central wheel of which is mounted coaxially with the hinged connection and between the fulcra common to the balancing arms and the links.

PATENTED JUL 6 1971  3,591,195

WHEEL ASSEMBLY FOR VEHICLES PARTICULARLY INTENDED FOR COMBINED ROAD AND CROSS-COUNTRY TRANSPORTS

This invention relates to a wheel assembly for vehicles, which are particularly intended for combined road and cross-country transports.

For cross-country transports in many cases vehicles are used which are provided with caterpillars or tracks, i.e. endless belts of articulated plates. The belts run over guide rollers whereof one or several usually are adapted to be driven by a motor. With such belts the specific surface pressure against the support is low and, therefore, the belts are well adapted for use on soil with poor bearing capacity. However, the belts when in operation are subject to high stresses and, therefore, must be manufactured of high-grade material. Vehicles with caterpillars must be driven only with a relatively low speed, because when in motion they give rise to heavy wear of the road surface. This wear is particularly heavy in curves, owing to the fact that such vehicles usually are steered by imparting to the caterpillars in the outer and inner curves of the vehicle different speeds in relation to each other. The vehicles, consequently, are more or less difficult to control. The vehicles, moreover, move relatively inflexibly over unevennesses in the support so that at an uneven nature of the ground considerable heeling and swinging motions are caused which, of course, expose the vehicle and persons riding therein to strains.

For cross-country transports also wheeled vehicles are used. The movability of these vehicles, however, usually depends more on the nature of the ground than the movability of the caterpillar vehicles. The applicability of wheels for this purpose, it is true, has been increased to a high degree by the modern tyre construction technique as well as by the introduction of bogies or wheel assemblies of different types, but the use of wheels was restrained because of their tendency of getting locked by obstacles with unsuitable inclination, particularly if the height of the obstacles exceeds the wheel radius. These shortcomings, however, have been eliminated to a large extent by the introduction of so-called self-climbing wheel assemblies. A wheel assembly of this type which at present is widely used and has proved highly applicable comprises two wheels or wheel sets, which are placed behind each other or in a tandem arrangement and are mounted on a common beam, which by two joints are swingingly suspended in a chassis frame in such a manner, that a four-joint mechanism is formed which has two upper and two lower fulcra, of which the latter have a relative distance, which is shorter than the distance between the upper fulcra. It was found, however, that it involves certain difficulties to obtain at such wheel assemblies a load on the wheels which is fully uniform in all positions of the wheels. A certain undesirable limitation with respect to wheel and axle load is also caused by the fact that these wheel assemblies can comprise only two wheels or wheel sets of tandem arrangement.

According to the invention, the disadvantages shown to be involved in caterpillar vehicles as well as in vehicles equipped with wheel assemblies of conventional type, are substantially eliminated by wheel assemblies of the design set forth in the characterizing clause of the main claim.

The invention is the invention in greater detail in the following, with reference to the accompanying drawing, which illustrates in a schematical way a vehicle equipped with a wheel assembly according to the invention.

Figure 1:
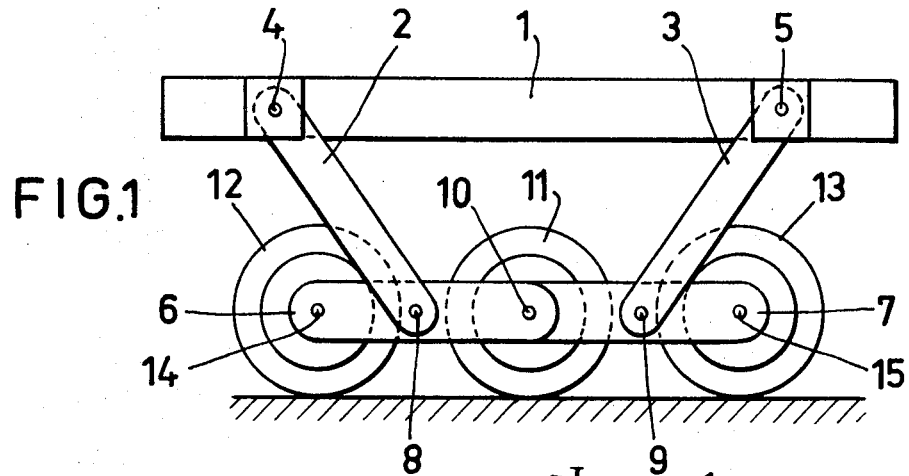
FIG. 1 shows a side view of the vehicle in a section along line I-I in FIG. 2.
Figure 2:
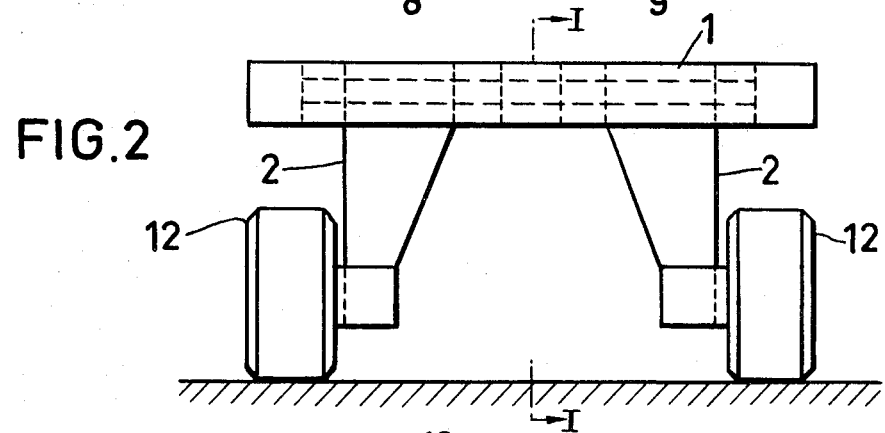
FIG. 2 shows an end view of the vehicle.

In FIGS. 1 and 2 a beam or frame portion of a of chassis is designated by 1. At said portion 1 two links 2, 3 are pivotally suspended by means of axle journals 4, 5 mounted in the fulcra. Each of the links 2, 3 carries at its lower end by means of axle journals 8, 9, forming the fulcra a balancing arm 6, 7. Said balancing arms 6, 7 are at one end hingedly connected with each other and carry a wheel 11, which is mounted coaxial with the fulcrum axle 10. At the opposite end, which is the outer end, each of the balancing arms 6, 7 carries a wheel 12, 13 mounted on an axle journal 14, 15. In this way, the arrangement constitutes a wheel assembly with three wheels placed behind each other or arranged in a tandem manner. The distance between the fulcra 8 and 9 is smaller than the distance between the fulcra 4 and 5, so that the links 2, 3 converge downwardly and in the normal position shown in FIG. 1 form an angle of approx. 45° with the portion 1. The system, as appears from FIG. 1, preferably is so constructed that the vertical plane through the fulcrum axle 10 in normal position is a plane of symmetry for the wheel assembly. It can thereby be of advantage to place the fulcra 8, 9 somewhat shifted to the axle journals 14, 15 of the outer wheels, so that the distance between the fulcra 8, 9 and the axle journal 10 is greater than the distance between the fulcra 8, 9 and the axle journals 14, 15 whereby the load on the central wheel is reduced. Preferably the distances between the fulcra 8, 9 and the axle journal 10 can be twice as great as the distances between the fulcra 8, 9 and the center of the axle journals 14, 15 because then the load will be distributed substantially uniformly on all three wheels.

Figure 3:
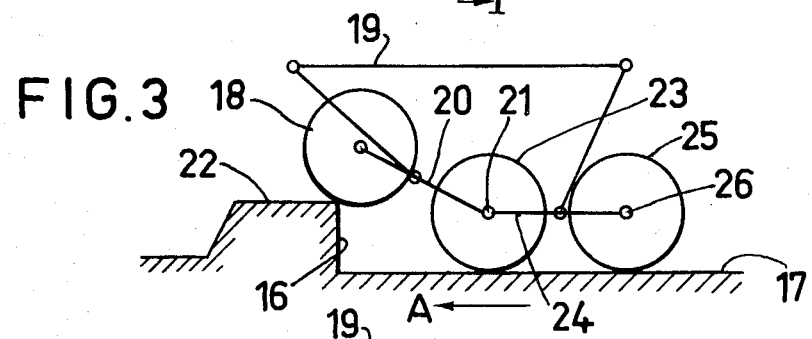
FIG. 3 and 4 are intended to demonstrate the working principle proper of the vehicle passing over an obstacle.
Figure 4:
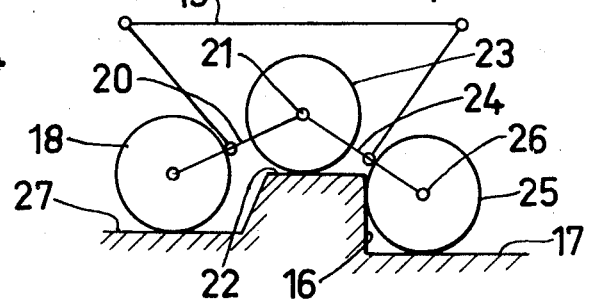

The operation of the wheel assembly becomes evident from the schematic FIGS. 3 and 4. The wheel assembly is here assumed to move in the direction of arrow A over an obstacle with a vertically upwardly directed surface 16. Its height above ground surface, represented by line 17, exceeds the radius of the wheel. In a starting position all wheels can be assumed to be in the horizontal plane 17. The wheel 18 located foremost in the direction of motion, thus, is the first wheel to bump against the vertical part 16 of the obstacle. For the sake of simplicity, the displacement of the wheel assembly which can be effected, for example, by a force applied to the frame portion 19 or by separately driving one or several of the wheels by means of hydraulically or electrically operating drive units, is assumed to be such that the portion 19 all the time at least approximately remains horizontal. As appears from FIG. 3, the wheel 18 by the swinging of the balancing arm 20 about the fulcrum 21 is forced upwards, so that the wheel finally arrives on the upper horizontal plane 22 of the obstacle. Upon continued motion in the direction of arrow A the central wheel 23 bumps against the surface 16 and is gradually lifted up onto the upper plane 22, as appears from FIG. 4, by the swinging motion of the balancing arm 24 about the center 26 of the rearmost wheel 25. Simultaneously, however, continues the displacement of wheel 18 so that this wheel is moved over to the plane 27 on a lower level. It is obvious that upon continued displacement of the wheel assembly in the direction of arrow A also the central wheel is moved down onto the plane 27, and that the rearmost wheel 25 in its turn passes over the obstacle in the same views of as the mill wheels 23, 25.

The wheel assembly according to the invention compared with conventional wheel assemblies of similar so-called self-climbing type shows a special advantageous property, viz. that the maximum vertical displacement of the loading plane which in FIGS. 3 and 4 is equal to the distance between the maximum and minimum height of the portion 19 above the plane 17, is extremely small in relation to the height of the obstacle. This is, of course, a particularly valuable property for cross-country vehicles both from an energy consumption point of view and because thereby the angular changes of the loading plane are very small.

The arrangement described above and shown in the drawing is, of course, to be regarded as merely one example of the embodiments covered by the scope of the inventive idea. It is consequently, not necessary so to place the wheels, as shown in FIG. 1, that their axle centers are located in one and the same straight line through the common fulcrum 10 of the balancing arms. The center of the central wheel 11, for example, may be located above or below the fulcrum 10. The wheel assembly, instead of with the wheels shown in FIG. 1, may be equipped with one or several wheel sets, each of which comprising two or more coaxially mounted wheels, which may be necessary for preventing that in a certain case the permissible maximum wheel load is exceeded. The balancing arms 6, 7 may, if necessary, form an angle with one another which is greater or smaller than 180°, in which case, however, the wheel diameters must so be adjusted to each other that in a normal position the lower tangential points of all wheels are located in one and the same plane. It is not necessary, either, that the lower fulcra of the joint arms are located, as shown in the drawing, in the same line as the centers of the wheels. It may, on the contrary, be advantageous to place these fulcra above the wheel centers.

The wheel assembly according to the invention is particularly adapted for use at trailers as well as at self-propelled vehicles, i.e. engine-driven vehicles. In both cases the vehicle preferably is equipped with at least one wheel assembly means every side. For engine-driven vehicles may thereby be applied a drive unit for each of the wheel assemblies or for one or several of their wheels, or it may be applied a drive motor common to all wheel assemblies, in such a way, that the power transmission from this motor is effected in a manner known per se by mechanical, hydraulic, pneumatic or electric power transmission means.

I claim:

1. Wheel assembly for cross-country transport vehicles having a frame comprising two links respectively articulated with said frame at points spaced by a predetermined distance, a balancing arm pivotally carried by each of said links thereby creating a pair of fulcrums common to said balancing arm and a link, said arms being hingedly connected with each other and supporting three wheels with mutually parallel axles, the central one of said wheels being mounted between said pair of fulcrums, said fulcrums being located between the axle center for the central wheel and the axle centers of the outer wheels and being spaced apart a distance which is smaller than said predetermined distance between the points of articulation of said links with said frame.

2. Wheel assembly according to claim 1 wherein each said fulcrum is located at a greater distance from the center of the central wheel than from the center of the nearest outer wheel.

3. Wheel assembly according to claim 1 wherein the axle of the central wheel is coaxial with the hinged connection of the balancing arms.

4. Wheel assembly according to claim 3 wherein each said fulcrum is located at a greater distance from the center of the central wheel than from the center of the nearest outer wheel.

5. Wheel assembly according to claim 1 wherein the wheels and the links in the normal rest position of the wheel assembly are symmetric with respect to the hinged connection of the balancing arms.

6. Vehicle wheel assembly according to claim 5 wherein the axle of the central wheel is coaxial with the hinged connection of the balancing arms.

7. Wheel assembly according to claim 5 wherein each said fulcrum is located at a greater distance from the center of the central wheel than from the center of the nearest outer wheel.

8. A cross-country vehicle comprising a frame, independent link pairs pivotally mounted in parallel maintained is on opposing sides of said frame, each said independent link pair including two links respectively articulated with said frame at points spaced by a predetermined distance, a balancing arm pivotally carried by each of said links thereby creating a pair of fulcrums common to said balancing arm and a link, said arms carried by each said link pair being hingedly connected with each other and supporting three wheels with mutually parallel axles, the central one of said wheels being mounted between said pair of fulcrums, said fulcrums being located between the axle center for the central wheel and the axle centers of the outer wheels and being spaced apart a distance which is smaller than said predetermined distance between the points of articulation of said links with said frame.

PO-1050
(5/69)

UNITED STATES PATENT OFFICE
CERTIFICATE OF CORRECTION

Patent No. 3,591,195      Dated JULY 6, 1971

Inventor(s) Bengt Erland Ilon, of Bromma, Sweden

It is certified that error appears in the above-identified patent and that said Letters Patent are hereby corrected as shown below:

Claim 8, col. 4, line 24 (corresponding to claim 12 of the application): delete "maintained is" and substitute therefor --array--.

Signed and sealed this 11th day of July 1972.

(SEAL)
Attest:

EDWARD M. FLETCHER, JR.      ROBERT GOTTSCHALK
Attesting Officer      Commissioner of Patents